(12) United States Patent
Tamai

(10) Patent No.: US 7,911,663 B2
(45) Date of Patent: Mar. 22, 2011

(54) IMAGE READING APPARATUS

(75) Inventor: Kensuke Tamai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 340 days.

(21) Appl. No.: 12/180,685

(22) Filed: Jul. 28, 2008

(65) Prior Publication Data

US 2009/0034022 A1    Feb. 5, 2009

(30) Foreign Application Priority Data

Jul. 30, 2007   (JP) ................................. 2007-197743

(51) Int. Cl.
*H04N 1/04*    (2006.01)
(52) U.S. Cl. ......... 358/497; 358/483; 358/482; 358/474
(58) Field of Classification Search ................ 358/483, 358/482, 497, 494, 474, 471, 512–514, 505; 399/211; 250/208.1, 239, 234–236, 216; 382/312, 318, 319
See application file for complete search history.

(56) References Cited

U.S. PATENT DOCUMENTS

| 5,769,515 | A  | * | 6/1998 | Chang ........................ 312/223.2 |
| 6,285,441 | B1 | * | 9/2001 | Takahara ......................... 355/67 |
| 6,952,292 | B2 | * | 10/2005 | Takeuchi et al. .............. 358/497 |
| 7,746,522 | B2 | * | 6/2010 | Oguri et al. .................... 358/497 |
| 2006/0152772 | A1 | * | 7/2006 | Sawada ......................... 358/474 |
| 2006/0203300 | A1 | * | 9/2006 | Choi ............................. 358/474 |
| 2007/0002397 | A1 | * | 1/2007 | Osakabe et al. ............. 358/474 |
| 2007/0002398 | A1 | * | 1/2007 | Ohama et al. ................ 358/474 |
| 2007/0165289 | A1 | * | 7/2007 | Osakabe ...................... 358/488 |

FOREIGN PATENT DOCUMENTS

| JP | 11-168592 | 6/1999 |
| JP | 2003-134307 | 5/2003 |
| JP | 2004-266314 | 9/2004 |

* cited by examiner

*Primary Examiner* — Cheukfan Lee
(74) *Attorney, Agent, or Firm* — Workman Nydegger

(57) ABSTRACT

Provided is an image reading apparatus including: an image reading sensor which reads an image from an original; and a mounting portion which mounts the image reading sensor, wherein the image reading sensor includes a positioning portion which is brought into contact with the mounting portion and adjusts the relative position of the image reading sensor with respect to the mounting portion; and a pressing portion which presses the positioning portion so as to bring the positioning portion into contact with the mounting portion.

6 Claims, 16 Drawing Sheets

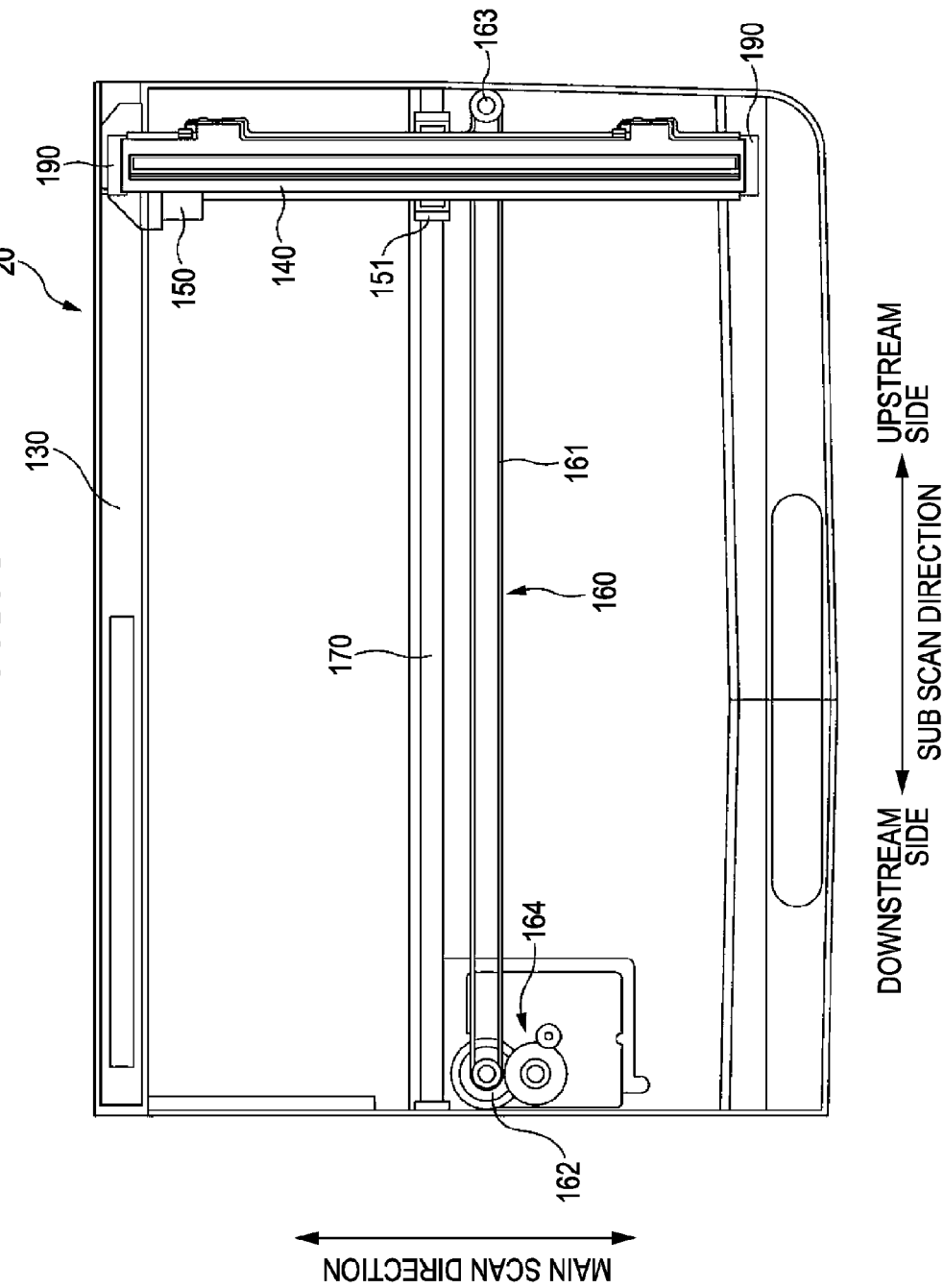

TITLE: IMAGE READING APPARATUS

BACKGROUND

1. Technical Field

The present invention relates to an image reading apparatus.

2. Related Art

An image reading apparatus including an image reading sensor for reading an image from an original and a mounting unit for mounting the image reading sensor is known (for example, see JP-A-11-168592). The image reading sensor may include a positioning unit which comes into contact with the mounting unit so as to position the image reading sensor relative to the mounting unit.

That is, in order to position the image reading sensor relative to the mounting unit, the positioning unit needs to be pressed toward the mounting unit and properly brought into contact with the mounting unit. Accordingly, if the positioning unit is not properly brought into contact with the mounting unit, the relative position is not properly adjusted. As a result, an image reading operation of the image reading sensor may be disturbed.

SUMMARY

An advantage of some aspects of the invention is that an image reading sensor is properly positioned relative to a mounting unit.

According to an aspect of the invention, there is provided an image reading apparatus including: an image reading sensor which reads an image from an original; and a mounting portion which mounts the image reading sensor, wherein the image reading sensor includes: a positioning portion which is brought into contact with the mounting portion and adjusts the relative position of the image reading sensor with respect to the mounting portion; and a pressing portion which presses the positioning portion so as to bring the positioning portion into contact with the mounting portion.

The other features of the invention will become apparent by the present specification and the accompanying drawings.

BRIEF DESCRIPTION OF THE DRAWINGS

The invention will be described with reference to the accompanying drawings, wherein like numbers reference like elements.

FIG. 5 is a view showing an internal structure of the scanner unit 20.

DESCRIPTION OF EXEMPLARY EMBODIMENTS

Figure 1:
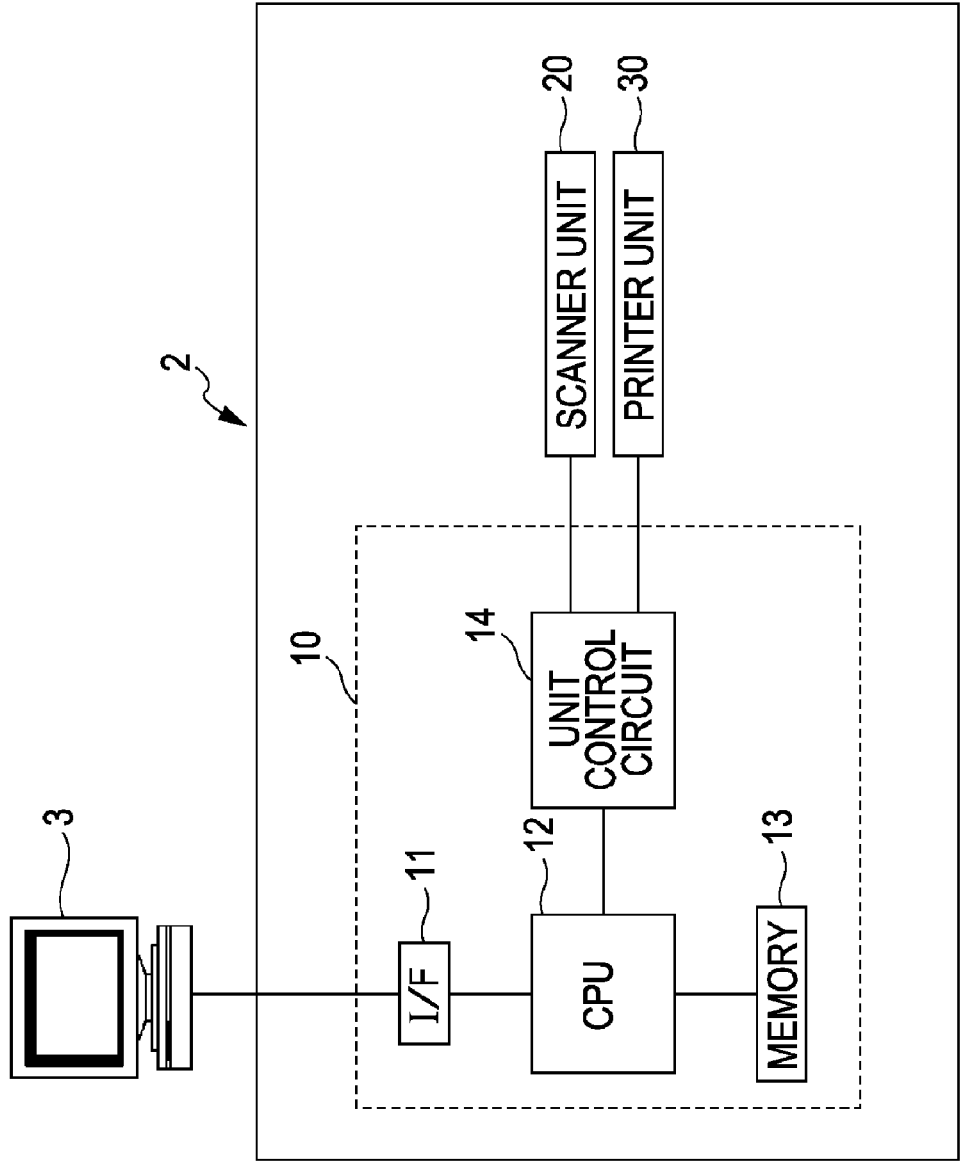
FIG. 1 is a block diagram of a multifunctional apparatus 2.

At least the following will become apparent from the description herein and the annexed drawings.

An image reading apparatus includes an image reading sensor which reads an image from an original, and a mounting portion which mounts the image reading sensor, and the image reading sensor includes a positioning portion which is brought into contact with the mounting portion and adjusts the relative position of the image reading sensor with respect to the mounting portion, and a pressing portion which presses the positioning portion so as to bring the positioning portion into contact with the mounting portion.

In the image reading apparatus having the above configuration, since the pressing portion directly presses the positioning portion, the positioning portion can be properly brought into contact with the mounting unit. As a result, the image reading sensor is properly positioned relative to the mounting portion.

In the image reading apparatus, the mounting portion may be a carriage which moves in a movement direction in a state in which the image reading sensor is mounted, and the positioning portion may adjust the relative position in the movement direction. In the image reading apparatus having the above configuration, when the carriage is moved in the movement direction, inertia force acts on the image reading sensor in the movement direction. Even in this case, the positioning portion is properly brought into contact with the carriage by the pressing portion such that the relative position is properly adjusted.

In the image reading apparatus, the image reading sensor may include two positioning portions, the two positioning portions may be located on ends of the image reading sensor in a longitudinal direction, and the pressing portion may press the two positioning portions so as to bring the positioning portions into contact with the carriage. In the image reading apparatus having the above configuration, the relative position can be more properly adjusted.

The image reading apparatus may further include an original platen on which the original is laid; and an energizing member which energizes the image reading sensor so as to face the original platen, wherein the carriage may have a surface to be contacted having a plane shape, the positioning portion may be a cylindrical or hollow cylindrical boss portion which adjusts the relative position by bringing a contact portion provided on the outer circumferential surface thereof into contact with the surface to be contacted, the image reading sensor may be mounted in the carriage so as to be relatively moved in an energizing direction of the energizing member, and, when the image reading sensor is relatively moved, the contact portion of the boss portion may slide and move on the surface to be contacted. In the image reading apparatus having the above configuration, friction resistance when the contact portion slides and moves on the surface to be contacted is reduced. Accordingly, in the image reading sensor which is moved integrally with the boss portion having the contact portion in the energizing direction, the relative movement in the energizing direction is facilitated.

In the image reading apparatus, the pressing portion may press the boss portion in the movement direction and the energizing direction. In the image reading apparatus having the above configuration, since the force in the energizing direction is applied from the pressing portion to the image reading sensor via the boss portion, the relative movement in the energizing direction is more facilitated in the image reading sensor.

The image reading apparatus, the mounting portion and the pressing portion may be provided by one member. In this case, the number of parts is reduced and thus the image reading apparatus can be simplified.

Image Reading Apparatus of Present Embodiment

Hereinafter, a multifunctional apparatus 2 which is an example of an image reading apparatus will be described with reference to FIG. 1. FIG. 1 is a block diagram of the multifunctional apparatus 2.

The multifunctional apparatus 2 includes a scanner function for reading an image from an original, a printer function for printing an image on a sheet of paper on the basis of print data from an external computer 3, and a copy function for printing an image read from an original on a sheet of paper.

As shown in FIG. 1, the multifunctional apparatus 2 includes a controller 10, a scanner unit 20 and a printer unit 30. The controller 10 is composed of the infrastructure of the multifunctional apparatus 2. The main components of the scanner unit 20 are provided on the upper side of the multifunctional apparatus 2 and the main components of the printer unit 30 are provided on the lower side thereof.

The controller 10 controls the multifunctional apparatus 2 and includes an interface 11 (I/F of FIG. 1), a CPU 12, a memory 13, and a unit control circuit 14. The CPU 12 controls the units (that is, the scanner unit 20 and the printer unit 30) by the unit control circuit 14 according to a program stored in the memory 13.

The scanner unit 20 includes glass 100 (for example, see FIG. 4A) as an original platen and an image reading sensor 140 (for example, see FIG. 5). In the scanner unit 20, when the original is laid on the glass 100, the image reading sensor 140 reads the overall image of the original and acquires the data of the image (hereinafter, also referred to as image data). The acquired image data is transmitted to the computer 3 via the controller 10. The scanner unit 20 reads the image from the original and acquires the image data such that the scanner function of the multifunctional apparatus 2 is performed. The detailed configuration of the scanner unit 20 will be described later.

The printer unit 30 alternately repeats a transporting operation for transporting the sheet and a dot forming operation for ejecting ink from nozzles provided in a head (not shown) which moves above the sheet and forming dots on the sheet, thereby printing an image on the sheet.

The printer unit 30 repeats the transporting operation and the dot forming operation such that the printer function of the multifunctional apparatus 2 is performed. The scanner unit 20 acquires the image data of the original and the printer unit 30 forms the image on the sheet on the basis of the image data such that the copy function of the multifunctional apparatus 2 is performed.

Basic Configuration of Scanner Unit

Figure 2:
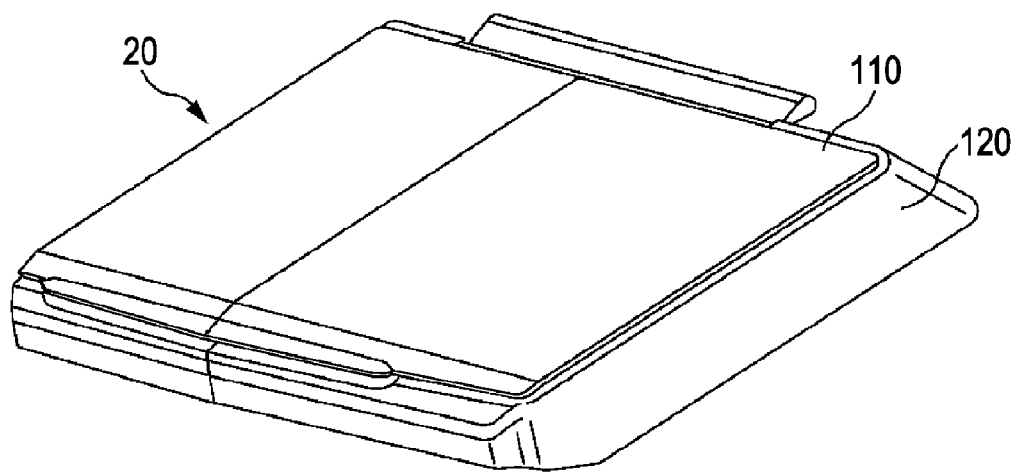
FIG. 2 is a perspective view of a scanner unit 20.
Figure 3:
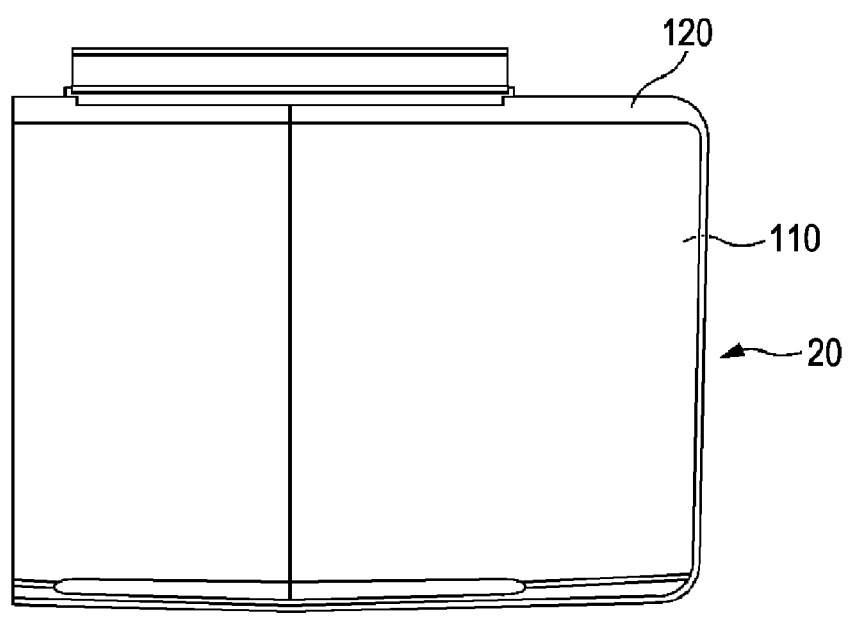
FIG. 3 is a top view of the scanner unit 20.
Figure 4A:
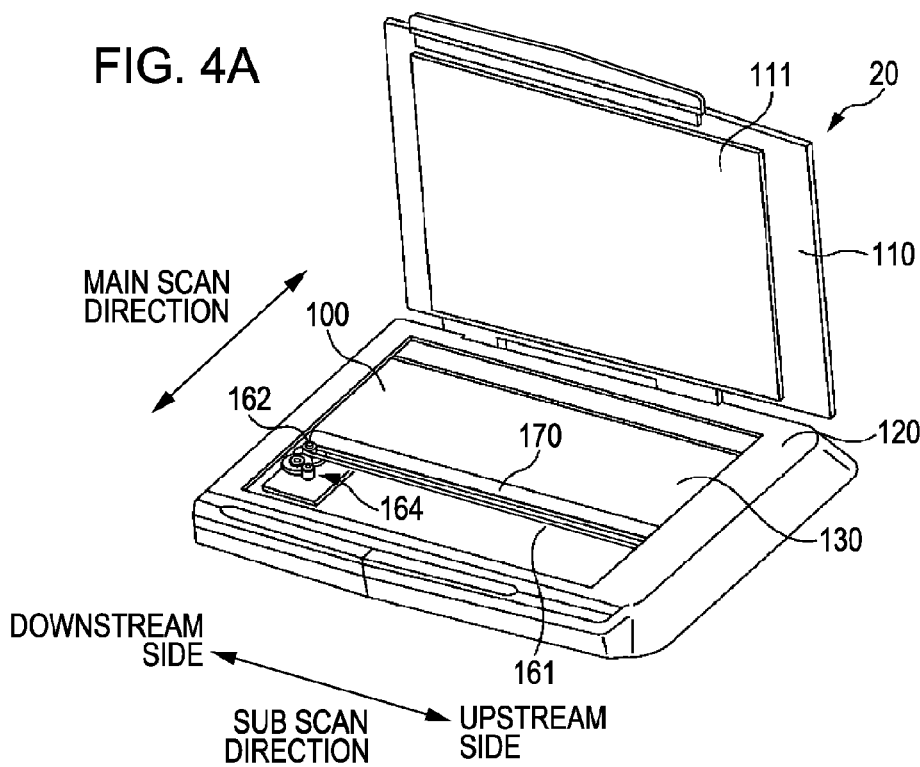
FIG. 4A is a perspective view showing the scanner unit 20 in a state in which an upper cover 110 is opened.
Figure 4B:
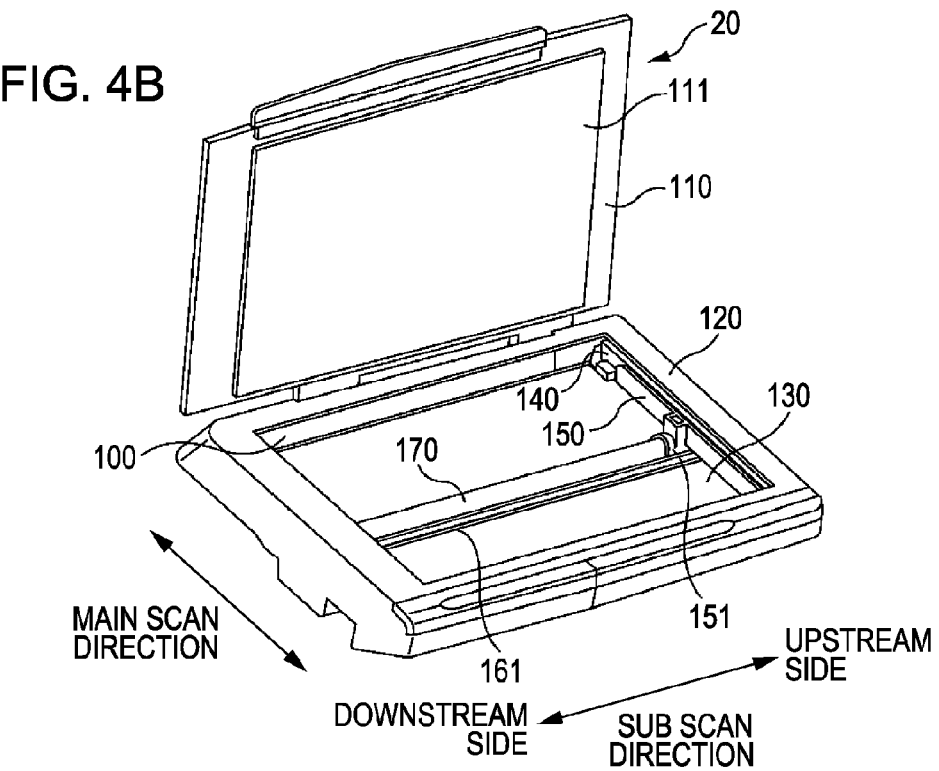
FIG. 4B is a perspective view showing the scanner unit 20 in a state in which the upper cover 110 is opened.

Next, the basic configuration of the scanner unit 20 will be described with reference to FIGS. 2 to 5. FIG. 2 is a perspective view of the scanner unit 20. FIG. 3 is a top view of the scanner unit 20. FIGS. 4A and 4B are perspective views showing the scanner unit 20 in a state in which an upper cover 110 is opened. In FIGS. 4A and 4B, a main scan direction and a sub scan direction are shown by arrows (the main scan direction and the sub scan direction will be described later). FIG. 5 is a view showing an internal structure of the scanner unit 20 and is a view showing the scanner unit 20 in a state in which the upper cover 110 and an upper casing 120 are detached when viewed from the upper side. In FIGS. 5A and 5B, the main scan direction and the sub scan direction are shown by arrows. For convenience of description, in the sub scan direction, a side where a driven pulley 163 is located is called an upstream side and a side where a driving pulley 162 is located is called a downstream side.

The scanner unit 20 has an appearance shown in FIG. 2 or 3 and is attached on the upper portion of the multifunctional apparatus 2. As shown in FIGS. 4A and 4B, the scanner unit 20 includes the openable upper cover 110 and the rectangular glass 100. On the upper cover 110, a white original mat 111 is attached. When the upper cover 110 is closed on the glass 100 in a state in which the original is laid, the original is horizontally set between the original mat 111 and the glass 100.

In the scanner unit 20, as shown in FIG. 5, the image reading sensor 140 for reading the image from the original, a carriage 150 which moves in a movement direction in a state in which the image reading sensor 140 is mounted, a driving mechanism 160 for moving the carriage 150 in the movement direction, a guide bar 170 for guiding the carriage 150 in the movement direction while supporting the carriage 150, and a spacer 190 for constantly maintaining a distance between the image reading sensor 140 and the glass 100 are included. These components are arranged in an upper casing 120 and a lower casing 130 in a state of being connected with one another.

The image reading sensor 140 is located below the glass 100, irradiates light onto the original on the glass 100, detects the reflected light and reads the image of the original. The image reading sensor 140 according to the present embodiment is a contact image sensor (CIS) of a contact optical system and performs an image reading operation while constantly maintaining the glass 100 and the image reading sensor. In the image reading sensor 140, a plurality of light receiving elements (not shown) of a CCD sensor 143 are included and the plurality of light receiving elements are arranged in the longitudinal direction of the image reading sensor 140. Hereinafter, a direction in which the plurality of light receiving elements are arranged is called the main scan direction.

The carriage 150 is an example of a mounting unit for mounting the image reading sensor 140. The image reading sensor 140 is mounted in the carriage 150 such that the longitudinal direction (main scan direction) of the image reading sensor 140 is approximately parallel to the longitudinal direction of the carriage 150. The carriage 150 moves together with the image reading sensor 140 in a state in which the image reading sensor 140 is mounted. In other words, the carriage 150 transports the image reading sensor 140.

The driving mechanism 160 includes a timing belt 161, a pair of pulleys (that is, a driving pulley 162 and a driven pulley 163) stretched over the timing belt 161, a driving motor (not shown) for rotating and driving the driving pulley 162, and a gear train 164 for delivering the driving of the driving motor to the driving pulley 162. The stretching direction of the timing belt 161 is an axial direction (sub scan direction) of the guide bar 170 and the timing belt 161 is fixed to the carriage 150. Accordingly, if the driving force of the driving motor is delivered to the timing belt 161 via the gear train 164 and the pair of pulleys, the timing belt 161 rotates in the stretching direction along the carriage 150. That is, the carriage 150 moves the sub scan direction by the rotation of the timing belt 161.

The guide bar 170 is a cylindrical member integrally formed with the lower casing 130, supports the carriage 150, and functions as a rail when the carriage 150 moves. That is, the carriage 150 moves in the axial direction of the guide bar 170. As shown in FIG. 5, the axial direction of the guide bar 170 is approximately perpendicular to the longitudinal direction (main scan direction) of the image reading sensor 140. That is, the movement direction of the carriage 150 is approximately perpendicular to the main scan direction. Hereinafter, the movement direction is called the sub scan direction.

The spacer 190 is an approximately U shape (for example, see FIG. 16) and is attached to the both ends of the image reading sensor 140 in the longitudinal direction. The spacer 190 is brought into contact with the glass 100 such that the distance between the image reading sensor 140 and the glass 100 is constantly maintained. The spacer 190 slides and rubs with the glass 100 when the image reading sensor 140 moves in the sub scan direction together with the carriage 150. The spacer 190 will be described later.

In the scanner unit 20 having the above-described configuration, whenever the image reading sensor 140 is transported by the carriage 150 in the sub scan direction by the distance corresponding to one pixel, the image reading operation 140 performs the reading operation. In one time of reading operation, the image data having a size corresponding to one pixel in the sub scan direction and the width of the original in the main scan direction is acquired. The image reading sensor 140 repeatedly performs the reading operation while being transported by a predetermined distance in the sub scan direction such that the overall image of the original on the glass 100 is read.

Image Reading Sensor and Carriage

When the image reading sensor 140 is mounted in the carriage 150, the position of the image reading sensor 140 relative to the carriage 150 is positioned. In the present chapter, the configurations of the image reading sensor 140 and the carriage 150 and the relative positions of the image reading sensor and the carriage in the present embodiment will be described.

Configuration of Image Reading Sensor

Figure 6:
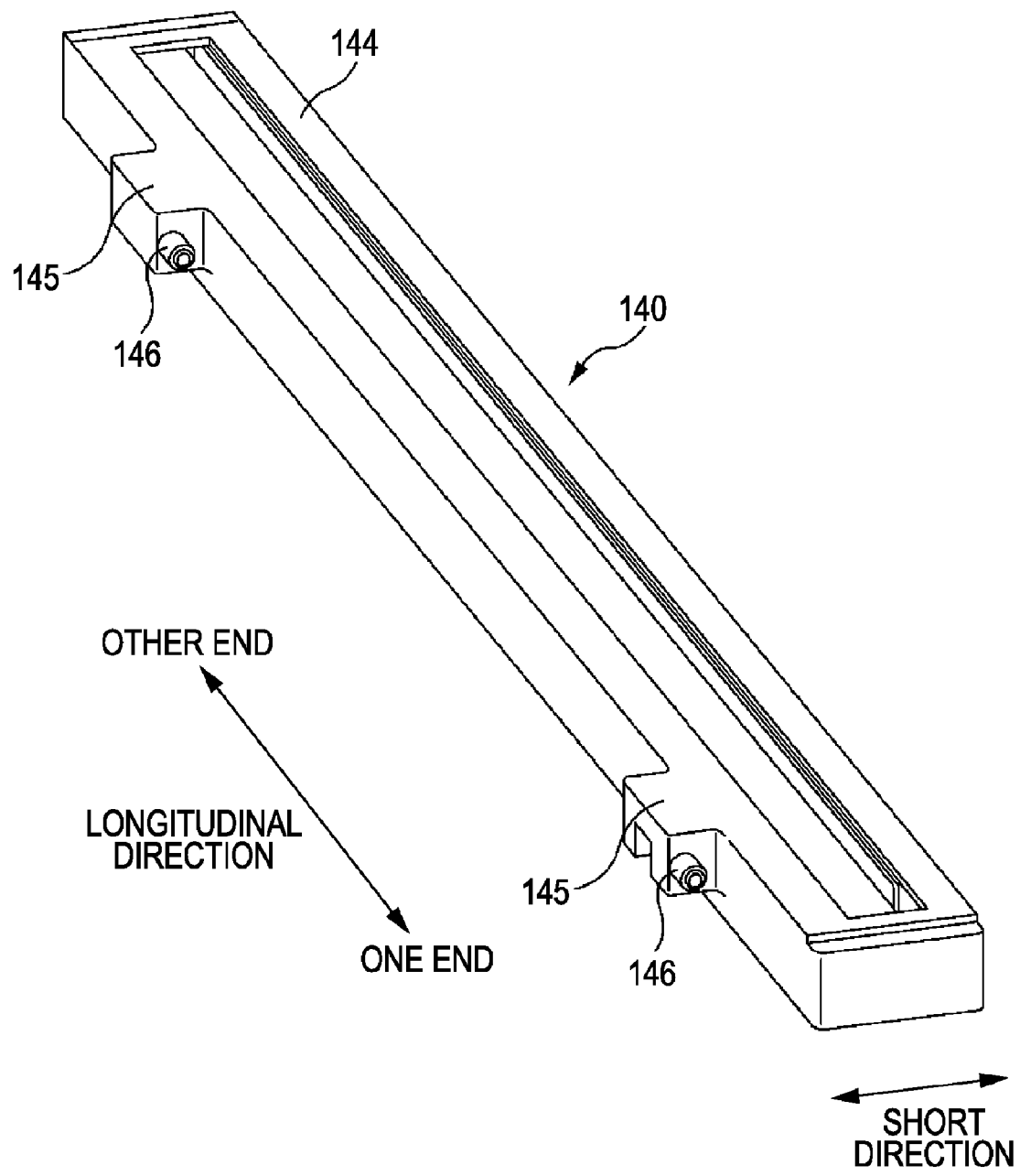
FIG. 6 is a perspective view of an image reading sensor 140.
Figure 7:
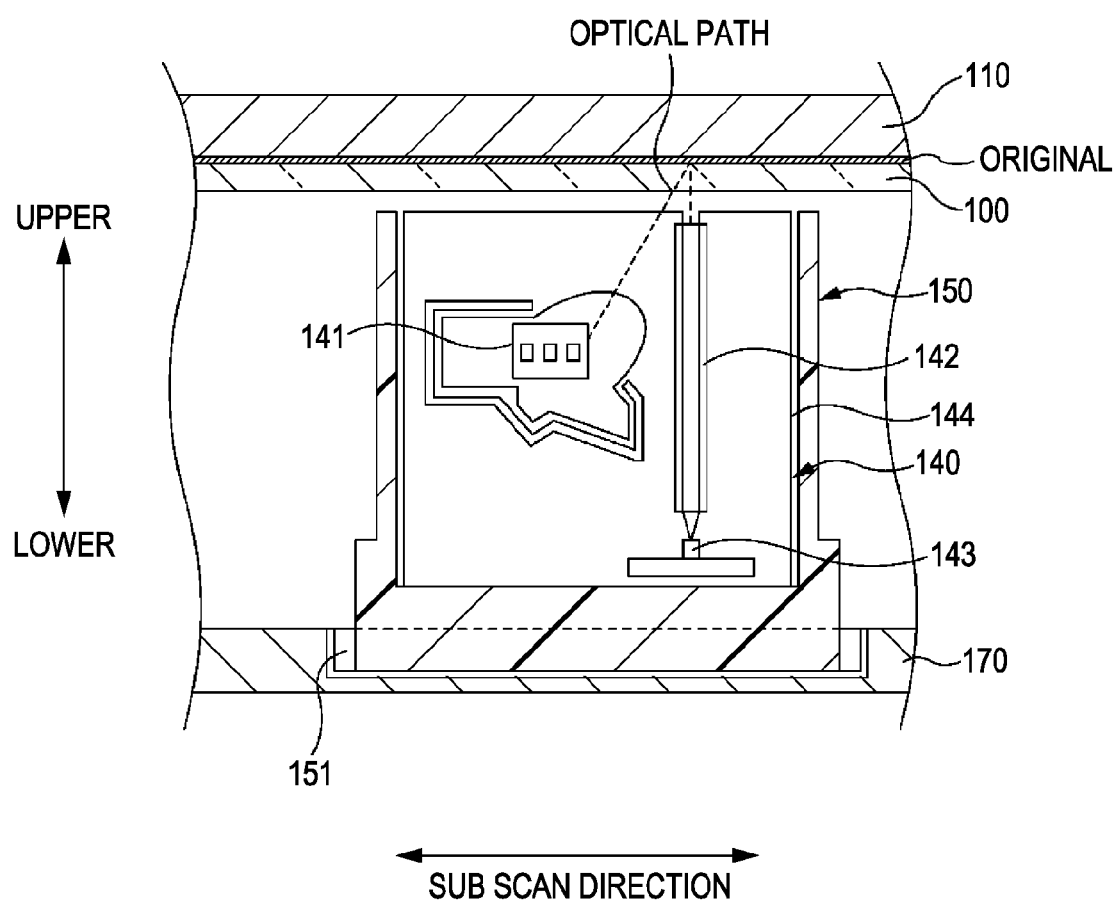
FIG. 7 is a schematic view showing the internal configuration of the image reading sensor 140.

First, the configuration of the image reading sensor 140 will be described with reference to FIGS. 6 and 7. FIG. 6 is a perspective view of the image reading sensor 140. In the drawing, the longitudinal direction and the short direction of the image reading sensor 140 are denoted by arrows. FIG. 7 is a schematic view showing the internal configuration of the image reading sensor 140. In the drawing, the vertical direction and the sub scan direction are denoted by arrows. In FIG. 7, the optical path of the incident light from the light source 141 and the reflected light reflected from the original is shown by a dotted line.

The image reading sensor 140 is a long size body shown in FIG. 6. As shown in FIG. 7, the casing 144 of the image reading sensor 140 includes the light source 141 for irradiating light onto the original, a rod lens array 142 for image-forming the reflected light reflected from the original, and a CCD sensor 143 for photoelectrically converting the formed image. In the scanner unit 20, the longitudinal direction of the image reading sensor 140 is approximately perpendicular to the transport direction when the image reading sensor 140 is transported by the carriage 150.

As shown in FIG. 6, a convex portion 145 protruding outward in the short direction is provided in the casing 144. The convex portion 145 is provided one end and the other end of the casing 144 in the longitudinal direction one by one. Among the surfaces of the casing 144, the surface on which the convex portion 145 is provided is positioned at the upstream side of the sub scan direction when the image reading sensor 140 is mounted in the carriage 150 (for example, see FIG. 14).

As shown in FIG. 6, a cylindrical boss portion 146 is provided on one end of the convex portion 145 in the longitudinal direction. That is, the image reading sensor 140 has two boss portions 146 and the two boss portions 146 are located at the ends of the image reading sensor 140 in the longitudinal direction. The central axis directions of the boss portions 146 are arranged in the longitudinal direction of the casing 144. When the image reading sensor 140 is mounted in the carriage 150, the boss portions 146 are brought into contact with the carriage 150. Although the boss portions 146 according to the present embodiment have a solid cylindrical shape, the present invention is not limited thereto and the boss portions may have a hollow cylindrical shape.

Configuration of Carriage

Figure 8:
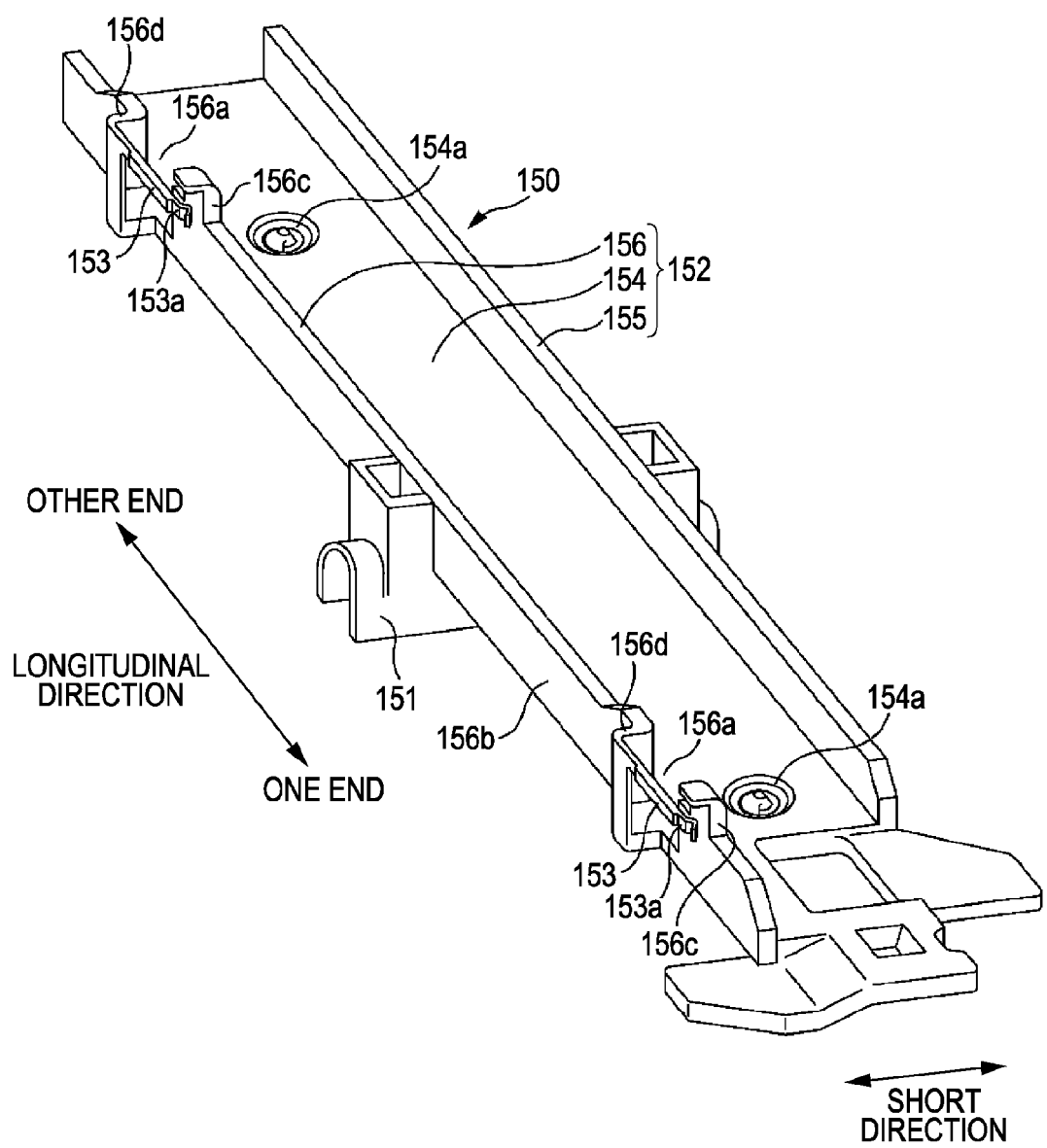
FIG. 8 is a perspective view of a carriage 150.
Figure 9:
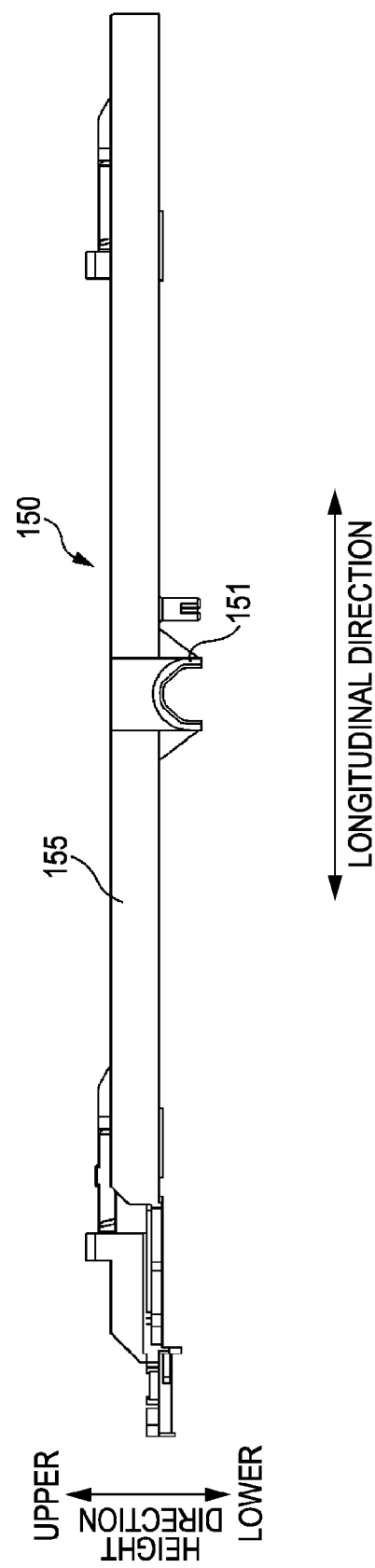
FIG. 9 is a front view of the carriage 150.
Figure 10:
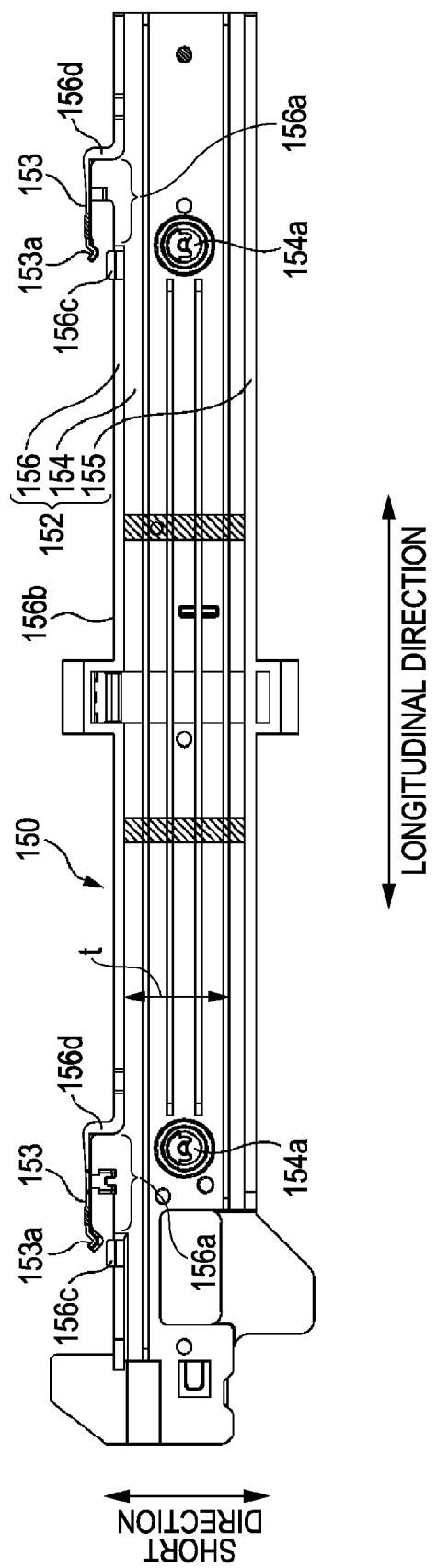
FIG. 10 is a top view of the carriage 150.
Figure 11:
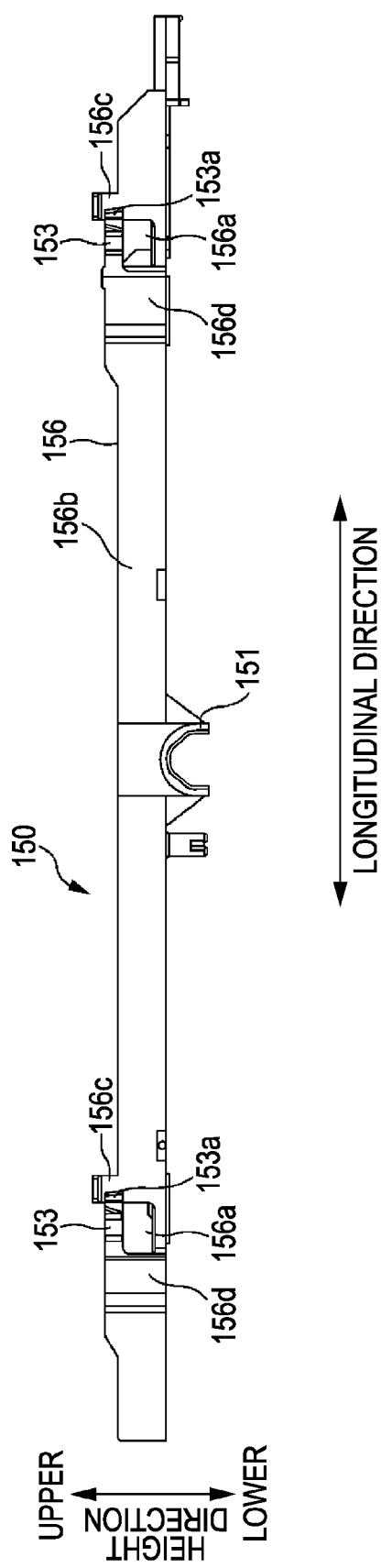
FIG. 11 is a rear view of the carriage 150.
Figure 12:
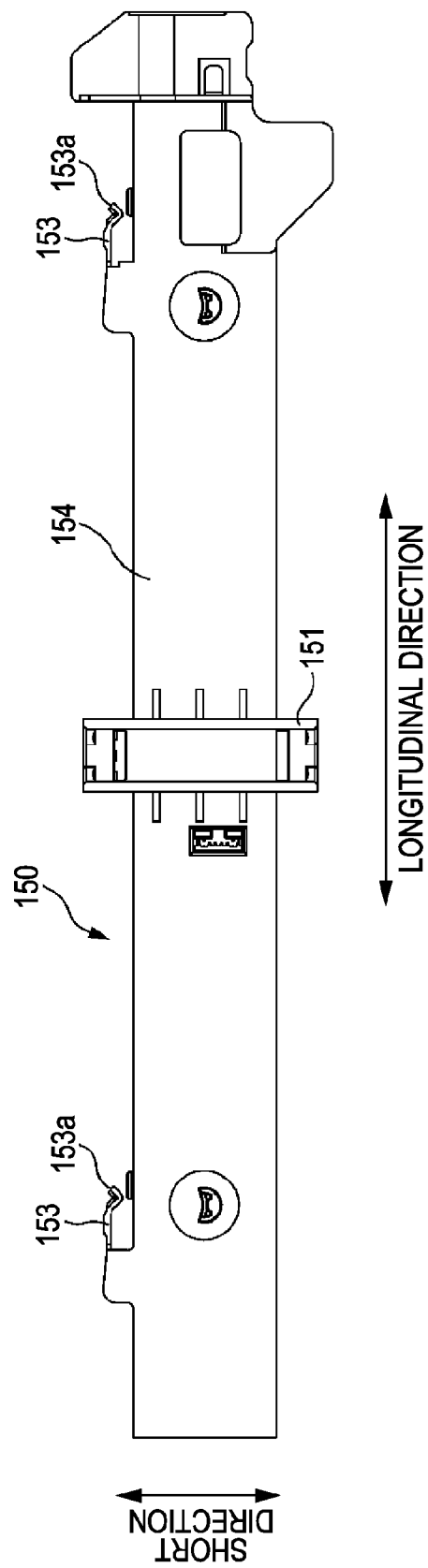
FIG. 12 is a bottom view of the carriage 150.
Figure 13:
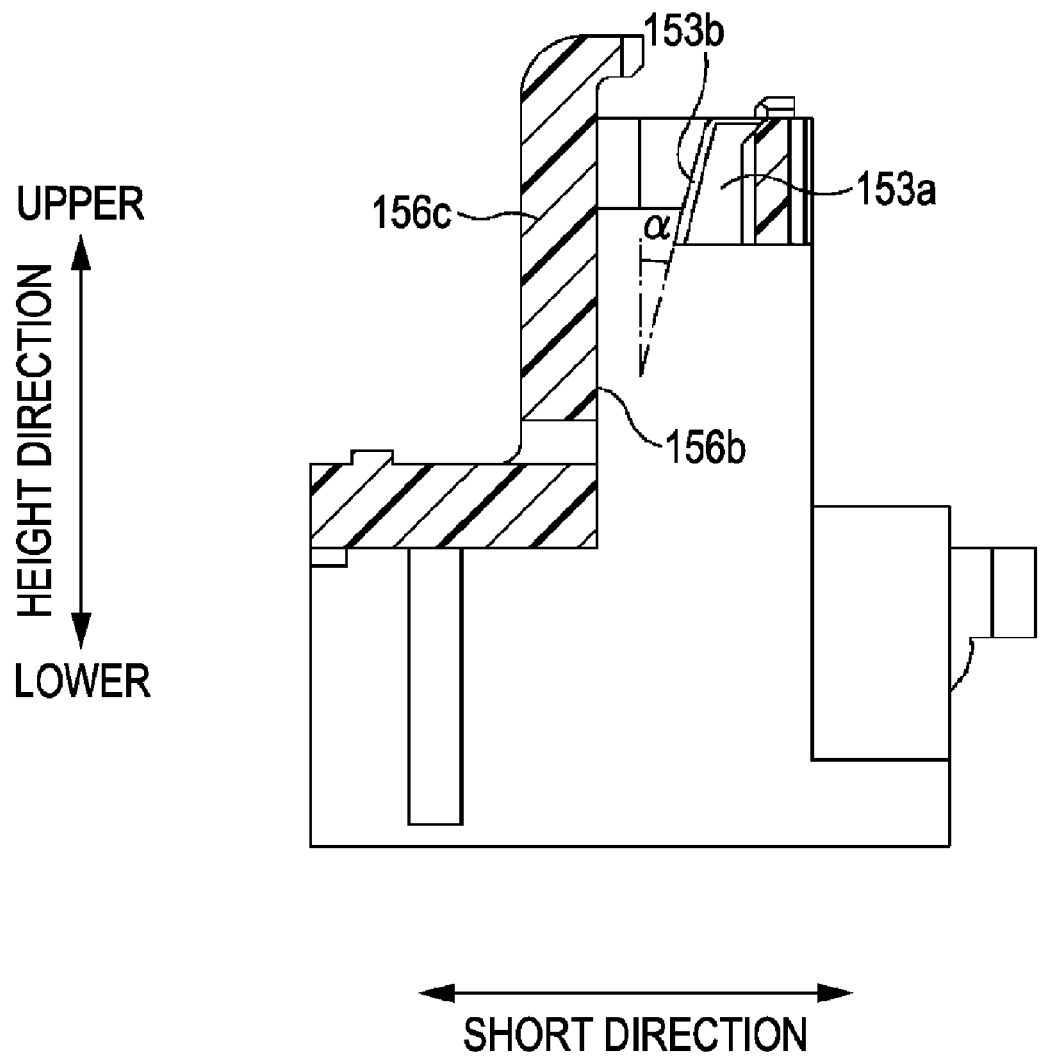
FIG. 13 is an enlarged view of the vicinity of a front end 153a of a pressing portion 153.

Next, the configuration of the carriage 150 will be described with reference to FIGS. 8 to 13. FIG. 8 is a perspective view of the carriage 150. In the drawing, the longitudinal direction and the short direction of the carriage 150 are denoted by arrows. FIG. 9 is a front view of the carriage 150 when viewed from the downstream side of the sub scan direction. FIG. 10 is a top view of the carriage 150. FIG. 11 is a rear view of the carriage 150 when viewing the carriage 150 from the upstream side of the sub scan direction. FIG. 12 is a bottom view of the carriage 150. FIG. 13 is an enlarged view of the vicinity of a front end 153a of a pressing portion 153. In FIGS. 9 to 13, the directions (that is, the longitudinal direction, the short direction and the height direction) of the carriage 150 are denoted by arrows.

The carriage 150 is a long size body made of resin such as plastic. As shown in FIG. 8, the carriage 150 includes an engagement portion 151, a sensor receiving portion 152 and the pressing portion 153.

As shown in FIGS. 9 and 11, the engagement portion 151 is provided on the lower portion of the carriage 150. The engagement portion 151 is curved in a bow shape and is engaged with the guide bar 170. When the engagement portion 151 is engaged with the guide bar 170, the carriage 150 is movably supported by the guide bar 170 in the sub scan direction. When the carriage 150 moves in the sub scan direction, the engagement portion 151 slides on the guide bar 170. The carriage 150 is supported by the guide bar 170 in a state in which the longitudinal direction thereof is approximately perpendicular to the axial direction of the guide bar 170 (that is, in a state in which the short direction of the carriage 150 is approximately parallel to the axial direction) (for example, see FIG. 5).

The sensor receiving portion 152 is mounted in the image reading sensor 140 and receives the image reading sensor 140. The sensor receiving portion 152 includes a bottom portion 154 and a pair of side portions 155 and 156 erected on the bottom portion 154 as shown in FIG. 8 or 10. The image reading sensor 140 is mounted and received between the pair of side portions 155 and 156 such that the longitudinal direction thereof is arranged in the longitudinal direction of the sensor receiving portion 152 (that is, the longitudinal direction of the carriage 150). The distance (distance t of FIG. 10) between the pair of side portions 155 and 156 is larger than the length of the short direction of the image reading sensor 140 (more accurately, the length of the short direction of the casing 144).

As shown in FIG. 12, the engagement portion 151 is attached on the lower surface of the bottom portion 154 at the approximately central position. As shown in FIG. 8 or 10, a depression 154a for attaching a coil spring 180 (for example, see FIG. 16) as an energizing member is provided on the upper surface of the bottom portion 154 outwardly from the position where the engagement portion 151 is attached. The pair of side portions 155 and 156 is approximately vertically erected on the bottom portion 154. In the pair of side portions 155 and 156, notches 156a are provided in the ends of the longitudinal direction of the side portion 156 located at the upstream side of the sub scan direction, as shown in FIGS. 10 and 11. In the present embodiment, as shown in FIG. 10, a position where the notches are provided in the longitudinal direction of the carriage 150 is approximately equal to a position where the depression 154a is provided. When the image reading sensor 140 is mounted and received in the sensor receiving portion 152, the convex portions 145 of the image reading sensor 140 are engaged with the notches 156a.

As shown in FIGS. 10 and 11, in the longitudinal direction of the carriage, protrusions 156c protruding upward are formed on the outsides of the notches 156a. The protrusions 156c are located on one end of the notches 156a in the longitudinal direction. As shown in FIG. 8, the front ends of the protrusions 156c are curved in an approximately L-shape so as to face the outside of the carriage 150 in the short direction. Meanwhile, as shown in FIGS. 8 and 10, bending portions 156d which are protruded toward the outside of the carriage 150 in the short direction and bent in an approximately L-shape so as to face one end of the carriage 150 in the longitudinal direction are provided on portions adjacent to the notches 156a at the ends of the notches 156a opposite to the ends on which the protrusions 156c are formed, in the side portion 156.

When the convex portions 145 of the image reading sensor 140 are engaged with the notches 156a of the side portion 156, the pressing portion 153 presses the boss portion 146 provided on the convex portion 145. The pressing portion 153 presses the boss portion 146 such that the boss portion 146 is brought into contact with the surface (hereinafter, referred to as an outer side surface 156b) of the side portion 156 located at the upstream side of the carriage 150 in the sub scan direction (for example, see FIG. 15). The pressing portion 153 of the present embodiment is a plate-shaped elastic body made of resin such as plastic and extends from the front end of the bending portion 156d to one end of the carriage 150 in the longitudinal direction, as shown in FIG. 8. The pressing portion 153 is integrally formed with the side portion 156 located at the upstream side of the transport direction. That is, the pressing portion 153 and the carriage 150 are formed by one member. That is, in the present embodiment, the number of parts is reduced compared with the case where the pressing portion 153 and the carriage 150 are separately formed. Accordingly, the configuration of the multifunctional apparatus 2 (more accurately, the scanner unit 20 of the multifunctional apparatus 2) is simplified.

Hereinafter, the pressing portion 153 will be described in more detail. The pressing portion 153 extends from the front end of the bending portion 156d as described above, and the front end 153a of the pressing portion 153 is located at a position reaching the front side of the protrusion 156c in the longitudinal direction of the carriage 150. As shown in FIG. 10, the front end 153a of the pressing portion 153 is bent toward the outer side surface 156b of the side portion 156 in a hook shape. In the front end 153a, one end of the pressing portion 153 in an extension direction is folded back toward the outside of the carriage 150 in the short direction. As shown in FIG. 13, a slope surface 153b which is inclined toward the outer side surface 156b is formed in the front end 153a at a position facing the outer side surface 156b of the side portion 156. When the convex portions 145 are engaged with the notches 156a, the slope surface 153b contacts the boss portion 146 and becomes a pressing surface for pressing the boss portion 146.

In the present embodiment, the slope angle (denoted by a symbol $\alpha$ in FIG. 13) of the slope surface 153b is about 15 degrees. In the previous stage in which the image reading sensor 140 is mounted in the carriage 150, the distance between the slope surface 153b and the outer side surface 156b is smaller than the diameter of the boss portion 146.

Positioning of Image Reading Sensor Relative to Carriage

Figure 14:
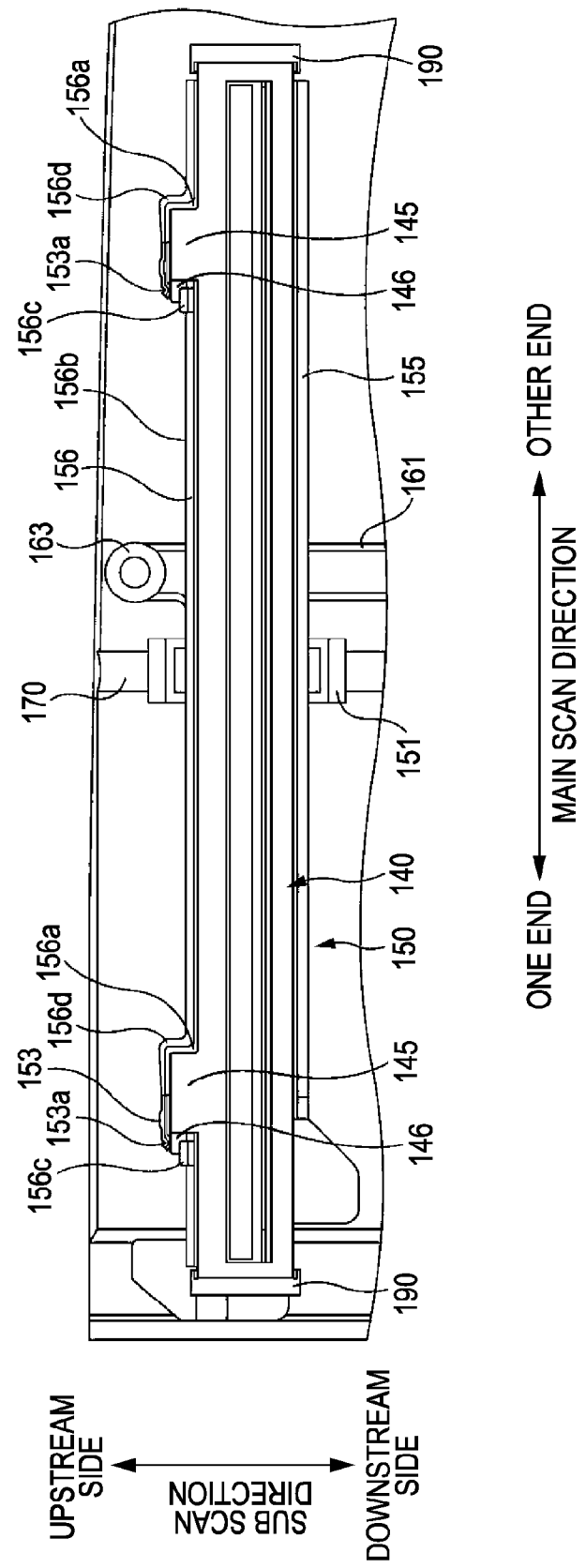
FIG. 14 is a top view showing the image reading sensor 140 mounted in the carriage 150.
Figure 15:
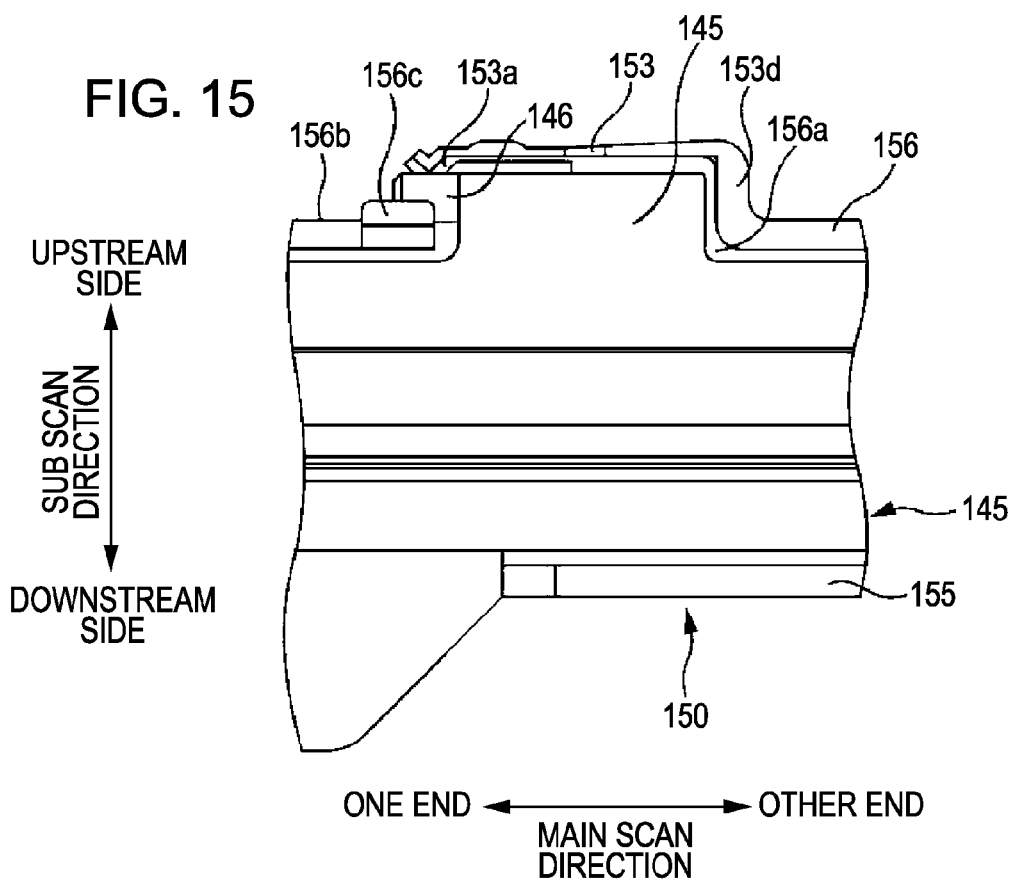
FIG. 15 is an enlarged view of the vicinity of a boss portion 146 in FIG. 14.
Figure 16:
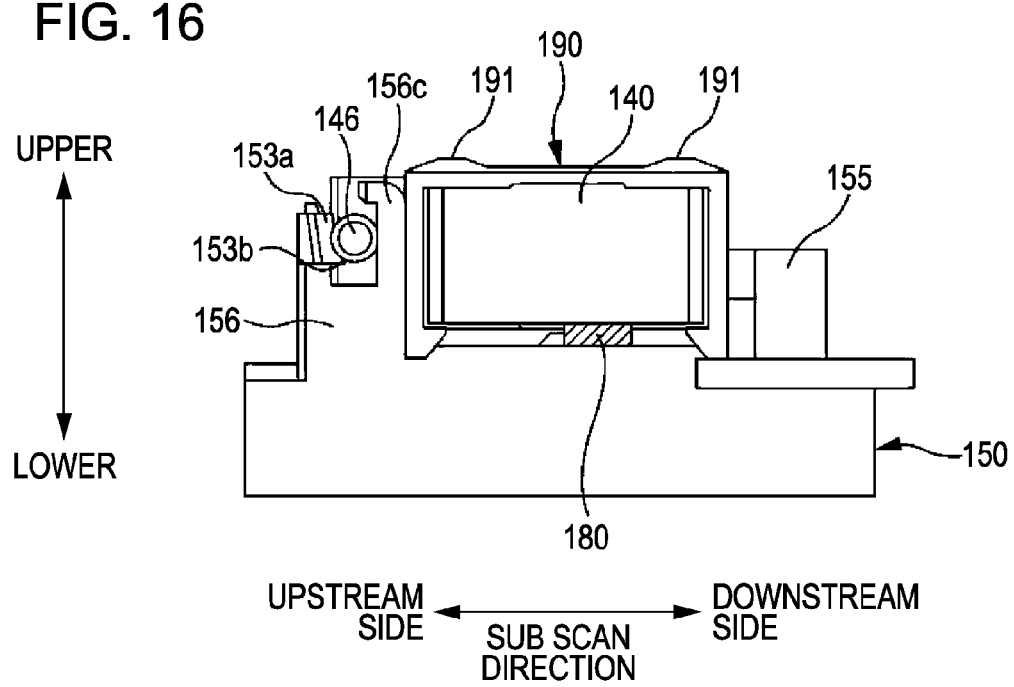
FIG. 16 is a side view of the image reading sensor 140 mounted in the carriage 150.
Figure 17:
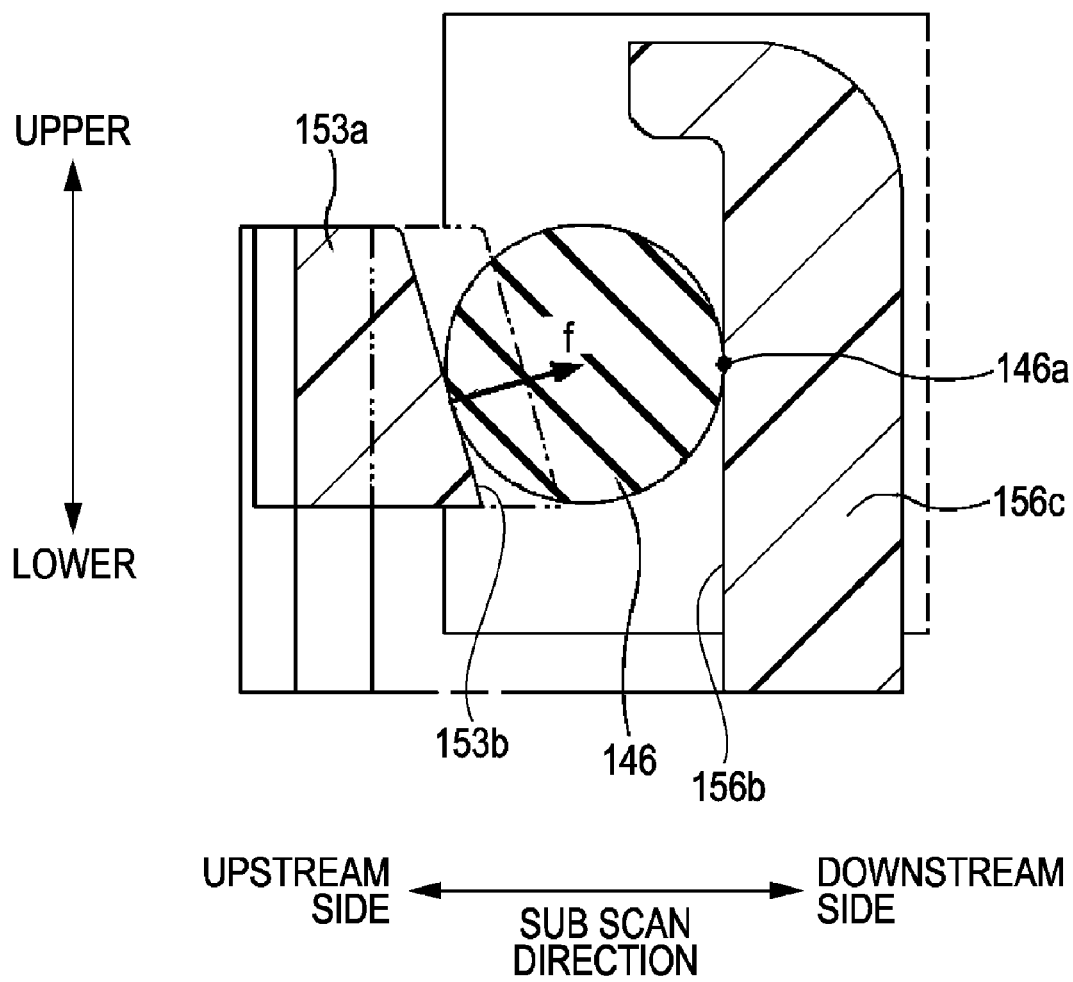
FIG. 17 is a view showing a state in which the pressing portion 153 presses the boss portion 146.

Next, the positioning of the image reading sensor 140 relative to the carriage 150 will be described with reference to FIGS. 14 to 17. FIG. 14 is a top view showing the carriage 150 and the image reading sensor 140 mounted in the carriage 150, in the drawing, the main scan direction and the sub scan direction are denoted by arrows. FIG. 15 is an enlarged view of the vicinity of the boss portion 146 in FIG. 14, and, in the drawing, the main scan direction and the sub scan direction are denoted by arrows. FIG. 16 is a side view of the carriage 150 and the image reading sensor 140 mounted in the carriage 150, and, in the drawing, the sub scan direction and the vertical direction are denoted by arrows. FIG. 17 is a view showing a state in which the pressing portion 153 presses the boss portion 146, and, in the drawing, the sub scan direction and the vertical direction are denoted by arrows.

As shown in FIG. 14, the image reading sensor 140 is mounted and received in the sensor receiving portion 152 included in the carriage 150, in a state in which the longitudinal direction thereof is equal to the longitudinal direction of the carriage 150 and the short direction thereof is equal to the short direction of the carriage 150. As shown in FIG. 14, when the image reading sensor 140 is mounted in the carriage 150, the convex portions 145 of the image reading sensor 140 are engaged with the notches 156a provided in the side portion 156 located at the upstream side of the sub scan direction.

As shown in FIG. 15, when the convex portions 145 are engaged with the notches 156a, the boss portion 146 of the image reading sensor 140 inserted between the pressing portion 153 and the side portion 156. The boss portion 146 inserted between the pressing portion 153 and the side portion 156 is pressed by the pressing portion 153 in a state in which the outer circumferential surface thereof is in contact with the slope surface 153b. As a result, the boss portion 146 is brought into contact with the outer side surface 156b of the side portion 156. As shown in FIG. 14, a portion of the outer side surface 156b which is in contact with the boss portion 146 (that is, a portion corresponding to the surface to be contacted, and hereinafter, also called a portion to be contacted) is arranged in the longitudinal direction of the carriage 150 and is a plane approximately perpendicular to a horizontal surface. The portion to be contacted extends from one end of the notch 156a in the longitudinal direction to a position where the protrusion 156c is provided.

The state in which the boss portion 146 is pressed by the pressing portion 153 so as to be in contact with the outer side surface 156b will be described from the pressing portion 153 with reference to FIG. 17.

Before the convex portions 145 are engaged with the notches 156a, that is, before the boss portion 146 is inserted between the pressing portion 153 and the side portion 156, the front end 153a of the pressing portion 153 is positioned at a position denoted by a dotted line in FIG. 17. At this time, the slope surface 153b formed on the front end 153a is separated from the outer side surface 156b of the side portion 156 by a distance shorter than the diameter of the boss portion 146. When the boss portion 146 is inserted between the pressing portion 153 and the side portion 156, the slope surface 153b is in contact with the outer circumferential surface of the boss portion 146 and the pressing portion 153 is pushed to the boss portion 146 so as to be folded back to the outside of the carriage 150 in the short direction. The front end 153a is positioned at a position denoted by a solid line in FIG. 17 by bending the pressing portion 153.

Meanwhile, by bending the pressing portion 153, a restoration force is generated in the pressing portion 153 and is applied to the boss portion 146 via the slope surface 153b. The force (denoted by a symbol F in FIG. 17) applied to the boss portion 146 acts on the slope surface 153b in the vertical direction. As shown in FIG. 17, the force F has a component from the slope surface 153b to the outer side surface 156b (more accurately, the portion to be contacted) of the side portion 156 in the sub scan direction. Accordingly, the boss portion 146 is pressed to the downstream side by the pressing portion 153 in the sub scan direction and is pushed to the portion to be connected of the outer side surface 156b. The outer circumferential surface of the boss portion 146 is brought into contact with the portion to be contacted by the pressing force of the pressing portion 153. That is, a contact portion 146a which contacts the portion to be contacted is provided on the outer circumferential surface of the boss portion 146.

In the present embodiment, the portion to be contacted of the outer side surface 156b has a plane shape, but the outer circumferential surface of the boss portion 146 has a curved surface having a constant radius of curvature. Accordingly, the boss portion 146 linearly contacts the portion to be contacted, that is, the contact portion 146a becomes a linear contact portion in the central axis of the boss portion 146. The linear contact indicates that the contact width between the boss portion 146 and the portion to be contacted is sufficiently smaller than the outer circumferential length of the boss portion 146.

When the image reading sensor 140 is mounted in the carriage 150 and the convex portions 145 of the image reading sensor 140 are engaged with the notches 156a of the side portion 156 included in the carriage 150, the boss portion 146 is pressed by the pressing portion 153 in the sub scan direction and thus the contact portion 146a is brought into contact with the portion to be contacted of the outer side surface 156b. As shown in FIG. 15, the boss portion 146 is pushed to the portion to be contacted by the pressing portion 153 in a state of being caught on a portion adjacent to the notch 156a of the side portion 156 (a portion adjacent to the notch 156a on a side where the protrusion 156c is provided). Accordingly, the image reading sensor 140 is fixed to the carriage 150 in the short direction of the carriage 150. That is, the boss portion 146 is brought into contact with the portion to be contacted by the pressing force of the pressing portion 153 and functions as a positioning member for positioning the relative position.

Since the contact direction in which the boss portion 146 is brought into contact with the portion to be contacted is the movement direction (sub scan direction) of the carriage 150, the carriage 150 is positioned relative to the image reading sensor 140 in the sub scan direction. As described above, the distance between the pair of side portions 155 and 156 is larger than the length of the image reading sensor 140 in the short direction. Accordingly, when the carriage is positioned relative to the image reading sensor, a small gap is generated between the image reading sensor 140 and the carriage 150 in the sensor receiving portion 152. That is, in the present embodiment, a portion of the image reading sensor 140 which is in contact with the carriage 150 for relative positioning is restricted to the contact portion 146a provided on the outer circumferential surface of the boss portion 146.

In the present embodiment, the image reading sensor 140 includes the two boss portions 146, and the two notches 156a are formed in the side portion 156 of the carriage 150 in correspondence therewith in order to engage the convex portions 145 provided with the boss portions 146. As shown in FIG. 14, the two notches 156a are located on the ends of the side portion 156 in the longitudinal direction. The bending portions 156d are formed in the portions adjacent to the notches 156a, and the pressing portions 153 extend from the bending portions 156d. That is, the two pressing portions 153 are provided on the side portion 156 and the pressing portions 153 are located on the ends of the side portion 156 in the longitudinal direction. The two pressing portions 153 press the two boss portions 146 and bring the boss portions into contact with the portion to be contacted of the outer side surface 156b.

The coil spring 180 is attached to the depression 154a of the carriage 150. Accordingly, when the image reading sensor 140 is mounted in the carriage 150, as shown in FIG. 16, the image reading sensor 140 is energized from the bottom surface by the coil spring 180 upward. The image reading sensor 140 is energized by the coil spring 180 and is moved relative to the carriage 150 in the energizing direction of the coil spring 180 (that is, upward in the vertical direction). In other words, the image reading sensor 140 is mounted in the carriage 150 so as to be relatively moved in the energizing direction. When the image reading sensor 140 is relatively moved in the energizing direction, the spacer 190 is brought into contact with the bottom surface of the glass 100. In more detail, as shown in FIG. 16, a rising portion 191 which rises in a mountain shape is provided on a portion of the spacer 190 opposite to the glass 100, and a vertex surface of the rising portion 191 is brought into contact with the bottom surface of the glass 100. Accordingly, the gap between the image reading sensor 140 and the glass 100 in the vertical direction is maintained at a constant value.

When the image reading sensor 140 is moved in the energizing direction, the boss portion 146 is integrally moved with the image reading sensor 140 in the energizing direction in a state in which the contact portion 146a provided on the outer circumferential surface thereof is in contact with the portion to be contacted of the outer side surface 156b. That is, when the image reading sensor 140 is moved in the energizing direction, the contact portion 146a of the boss portion 146 slides and moves on the outer side surface 156b in the energizing direction in a state in which the boss portion 146 is relatively positioned in the sub scan direction. As described above, since the boss portion 146 linearly contacts the portion to be contacted, friction resistance when the contact portion 146a slides and moves on the outer side surface 156b is reduced, compared with the case where the boss portion 146 surface-contacts the outer side surface 156b. That is, in the present embodiment, the image reading sensor 140 is susceptible to be relatively moved in the energizing direction, compared with the case where the boss portion 146 surface-contacts the outer side surface 156b.

The boss portion 146 receives the force (that is, the force F of FIG. 17) acting on the slope surface 153b in the vertical direction when being pressed by the slope surface 153b of the pressing portion 153. As described above, the force F has the component from the slope surface 153b to the outer side surface 156b of the side portion 156 in the sub scan direction and an upward component in the vertical direction. That is, the pressing portion 153 presses the boss portion 146 in the sub scan direction and the upward direction, that is, the energizing direction of the coil spring 180. Accordingly, since the force of the energizing direction is applied from the pressing portion 153 to the image reading sensor 140 via the boss portion 146, the image reading sensor 140 is susceptible to be relatively moved in the energizing direction.

Validity of Multifunctional Apparatus of Present Embodiment

Figure 18:
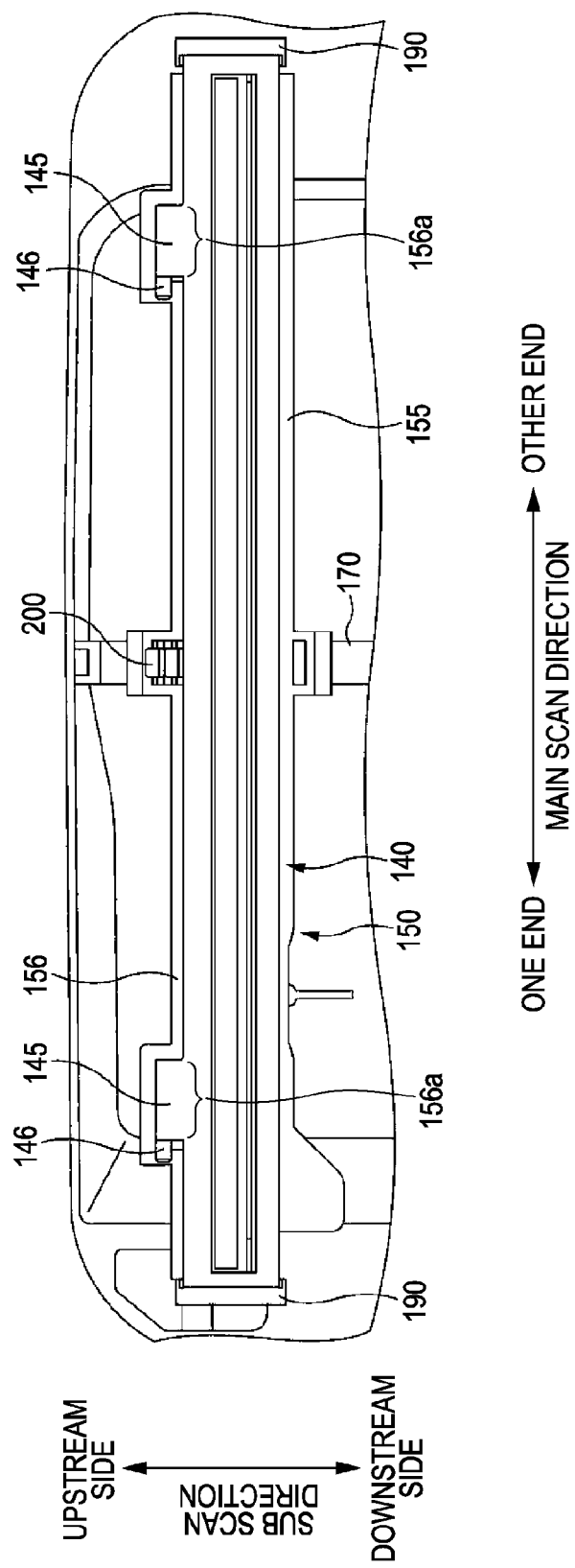
FIG. 18 is a view showing a scanner unit mounted in a multifunctional apparatus of the related art.

The multifunctional apparatus 2 which is the image reading apparatus of the present embodiment includes the image reading sensor 140 and the carriage 150 for mounting the image reading sensor 140 in the scanner unit 20. The image reading sensor 140 includes the boss portion 146 which is brought into contact with the outer side surface 156b (more accurately, the portion to be contact of the outer side surface 156b) of the side portion 156 included in the carriage 150 so as to be positioned relative to the carriage 150 of the image reading sensor 140. In the scanner unit 20, the pressing portions 153 which press the boss portions 146 and bring the boss portions 146 into contact with the outer side surface 156b is provided. By this configuration, it is possible to properly position the image reading sensor 140 relative to the carriage 150. Hereinafter, the validity of the multifunctional apparatus 2 of the present embodiment will be described with reference to FIG. 18. FIG. 18 is a view showing a scanner unit mounted in a multifunctional apparatus of the related art, which corresponds to FIG. 14. In the drawing, the main scan direction and the sub scan direction are denoted by arrows.

As described in the related art, in the image reading sensor, a positioning portion which is brought into contact with the carriage and positions the image reading sensor relative to the carriage is included. Even in the related art, as shown in FIG. 18, the image reading sensor 140 includes the boss portions 146 as the positioning portion and the boss portions 146 are brought into contact with predetermined portions of the carriage 150 such that the relative position is properly adjusted when the image reading sensor 140 is mounted in the carriage 150.

The relative position is properly decided if the boss portions 146 are in contact with the predetermined portions. However, when the boss portions 146 are separated from the predetermined portions, the relative position is changed and thus backlash occurs on the carriage 150 in the image reading sensor 140. When the backlash occurs in the image reading sensor 140, the carriage 150 is moved along the image reading sensor 140 and vibration occurs in the image reading sensor 140. The occurrence of the vibration causes abnormal noise and deteriorates the accuracy of the image reading operation of the image reading sensor 140.

In order to prevent this problem, in the related art, as shown in FIG. 18, a leaf spring 200 for pressing the image reading sensor 140 in the short direction of the carriage 150, that is, the sub scan direction, is provided in the carriage 150. The leaf spring 200 presses the image reading sensor 140 mounted in the carriage 150 to the downstream side in the sub scan direction so as to bring the boss portions 146 into contact with the carriage 150.

However, as shown in FIG. 18, the leaf spring 200 is located on the central portion of the carriage 150 in the longitudinal direction and is separated from the boss portions 146. That is, in the related art, the position to which the pressing force from the leaf spring 200 is applied is separated from the position on which the pressing force acts (that is, the position where the boss portions 146 are pressed). Accordingly, the pressing force of the leaf spring 200 is not properly delivered to the boss portions 146 and thus the boss portions 146 may not be sufficiently pressed. In this case, it is difficult to maintain the contact state between the carriage 150 and the boss portions 146 and properly adjust the relative position.

In contrast, in the present embodiment, the pressing portions 153 are brought into contact with the boss portions 146 and the pressing force of the pressing portions directly acts on the boss portions 146. That is, the boss portions 146 are directly pressed by the pressing portions 153 so as to be properly brought into contact with the portion to be contacted of the outer side surface 156b. Accordingly, since the contact state of the boss portions and the portion to be contacted are properly maintained, the relative position can be properly adjusted.

In the present embodiment, the contact direction when the boss portions 146 are pressed by the pressing portions 153 and the boss portions 146 are brought into contact with the portion to be contacted of the outer side surface 156b is equal to the movement direction (sub scan direction) of the carriage 150. That is, the boss portions of the present embodiment are relatively positioned in the sub scan direction. In this case, the pressing portions 153 directly press the boss portions 146 so as to bring the boss portions 146 into contact with the portion to be contacted such that the relative position can be properly adjusted.

In more detail, the carriage 150 is moved in the sub scan direction such that inertia force acts on the image reading sensor 140 transported by the carriage 150 in the sub scan direction. Accordingly, if the boss portions 146 are not properly pressed, the boss portions 146 are separated from the outer side surface 156b by the inertia force and thus the relative position is susceptible to be changed in the sub scan direction. In contrast, in the present embodiment, since the boss portions 146 are properly pressed by the pressing portions 153 in the sub scan direction, the contact state between the boss portions 146 and the portion to be contacted of the outer side surface 156b can be properly maintained. As a result, the relative position is properly adjusted. In the present embodiment, even when the inertia force acts on the image reading sensor 140 in the sub scan direction, the relative position can be properly adjusted in the sub scan direction.

In the present embodiment, in the image reading sensor 140, the two boss portions 146 are included. The two pressing portions 153 are provided in the carriage 150. The two boss portions 146 are pressed by the pressing portions 153 so as to be brought into contact with the outer side surface 156b such that the relative position is adjusted. That is, the position of the image reading sensor 140 in the sub scan direction is fixed to the carriage 150 by the two boss portions 146. Accordingly, for example, compared with the case where only one boss portion 146 is included in the image reading sensor 140, the relative position in the sub scan direction is properly adjusted and becomes more stable.

In the present embodiment, since the two boss portions are located on the ends of the image reading sensor 140 in the longitudinal direction, the relative position is more properly adjusted.

Other Embodiments

Although the image reading apparatus is described on the basis of the above-described embodiment, the embodiment of the invention facilitates the understanding of the invention and does not limit the invention. The invention can be modified or changed without departing from the scope of the invention and includes the equivalent thereof.

The multifunctional apparatus 2 is described as the example of the image reading apparatus in the embodiment. That is, although the image reading apparatus which is integral with the printer unit 30 as a printing device, the invention is not limited thereto. The image reading apparatus may be a scanner which is not integral with the printing device.

What is claimed is:

1. An image reading apparatus comprising:
   an image reading sensor which reads an image from an original; and
   a mounting portion comprising a carriage which moves in a movement direction in a state in which the image reading sensor is mounted,
   wherein the image reading sensor includes:
   a positioning portion which is brought into contact with the mounting portion and adjusts the relative position of the image reading sensor with respect to the mounting portion in the movement direction; and
   wherein the mounting portion includes a pressing portion which presses the positioning portion so as to bring the positioning portion into contact with the mounting portion.

2. The image reading apparatus according to claim 1, wherein:
   the image reading sensor includes two positioning portions,
   the two positioning portions are located on ends of the image reading sensor in a longitudinal direction, and
   the pressing portion presses the two positioning portions so as to bring the positioning portions into contact with the carriage.

3. The image reading apparatus according to claim 1, further comprising:
   an original platen on which the original is laid; and
   an energizing member which energizes the image reading sensor so as to face the original platen,
   wherein the carriage has a surface to be contacted having a plane shape,
   the positioning portion is a cylindrical or hollow cylindrical boss portion which adjusts the relative position by bringing a contact portion provided on the outer circumferential surface thereof into contact with the surface to be contacted,
   the image reading sensor is mounted in the carriage so as to be relatively moved in an energizing direction of the energizing member, and
   when the image reading sensor is relatively moved, the contact portion of the boss portion slides and moves on the surface to be contacted.

4. The image reading apparatus according to claim 3, wherein the pressing portion presses the boss portion in the movement direction and the energizing direction.

5. An image reading apparatus comprising:
   an image reading sensor which reads an image from an original;
   a mounting portion which mounts the image reading sensor,
   wherein the image reading sensor includes:
      a positioning portion which is brought into contact with the mounting portion and adjusts the relative position of the image reading sensor with respect to the mounting portion;
      wherein the mounting portion includes:
      a pressing portion which presses the positioning portion so as to bring the positioning portion into contact with the mounting portion;
   wherein the mounting portion is a carriage which moves in a movement direction in a state in which the image reading sensor is mounted, and the positioning portion adjusts the relative position in the movement direction;
   an original platen on which the original is laid; and
   an energizing member which energizes the image reading sensor so as to face the original platen,
   wherein the carriage has a surface to be contacted having a plane shape,
   the positioning portion is a cylindrical or hollow cylindrical boss portion which adjusts the relative position by bringing a contact portion provided on the outer circumferential surface thereof into contact with the surface to be contacted,
   the image reading sensor is mounted in the carriage so as to be relatively moved in an energizing direction of the energizing member, and
   when the image reading sensor is relatively moved, the contact portion of the boss portion slides and moves on the surface to be contacted.

6. An image reading apparatus comprising:
   an image reading sensor which reads an image from an original;
   a mounting portion which mounts the image reading sensor,
   wherein the image reading sensor includes:
      a positioning portion which is brought into contact with the mounting portion and adjusts the relative position of the image reading sensor with respect to the mounting portion;
      wherein the mounting portion includes:
      a pressing portion which presses the positioning portion so as to bring the positioning portion into contact with the mounting portion;
   wherein the mounting portion is a carriage which moves in a movement direction in a state in which the image reading sensor is mounted, and the positioning portion adjusts the relative position in the movement direction;
   an original platen on which the original is laid; and
   an energizing member which energizes the image reading sensor so as to face the original platen,
   wherein the carriage has a surface to be contacted having a plane shape,
   the positioning portion is a cylindrical or hollow cylindrical boss portion which adjusts the relative position by bringing a contact portion provided on the outer circumferential surface thereof into contact with the surface to be contacted,
   the image reading sensor is mounted in the carriage so as to be relatively moved in an energizing direction of the energizing member, and
   when the image reading sensor is relatively moved, the contact portion of the boss portion slides and moves on the surface to be contacted;
   wherein the pressing portion presses the boss portion in the movement direction and the energizing direction.

* * * * *